April 29, 1941. J. JOROSLOW 2,240,402
ILLUMINATED MICROSCOPE
Filed March 9, 1939
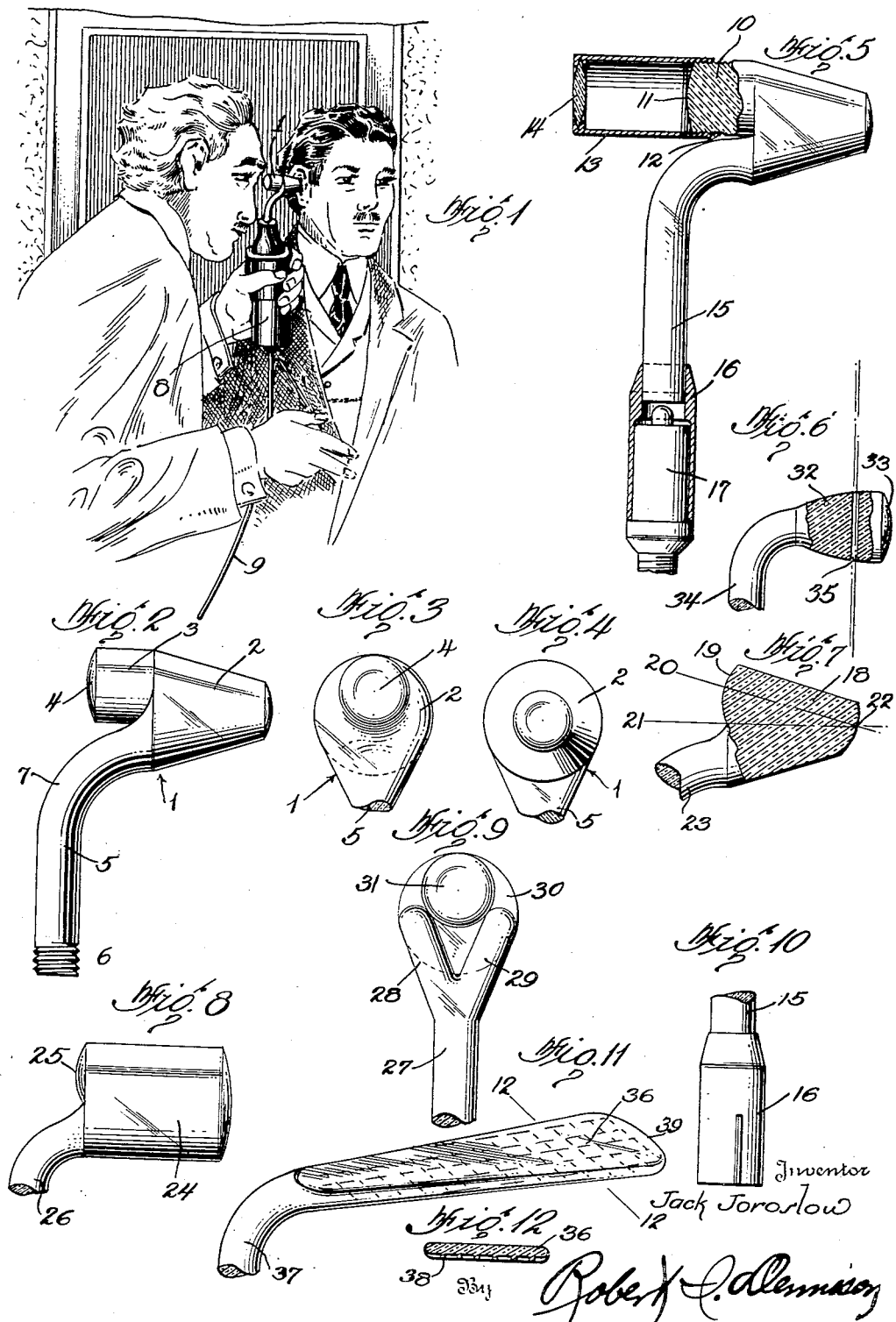

Patented Apr. 29, 1941

2,240,402

UNITED STATES PATENT OFFICE 2,240,402

ILLUMINATED MICROSCOPE

Jack Joroslow, Los Angeles, Calif., assignor to Plastic Process Company, a corporation of California Application March 9, 1939, Serial No. 260,856

16 Claims. (Cl. 88—39)

The present invention relates to improvements in optical instruments and has reference more particularly to an illuminated microscope.

One of the important objects of the present invention resides in the provision of an instrument, capable of being used for diagnostic purposes in examining the orifices of the body, such as the ear, nose, throat, etc.

Another important object of the invention is to provide an illuminated microscope constructed of a transparent solid plastic material, either thermo-setting or thermo-plastic of great optical clarity and possessing similar refractive qualities to quartz.

A still further object is to provide a device of the above mentioned character, having a light source associated with the microscope, in such a manner that the rays of light will be transmitted through the microscope from said source by the phenomenon of internal reflection and caused to traverse a path determined by the shape of the transparent conducting medium, and being finally emitted at the outer end thereof, and without being emitted through the side walls of said transparent medium, nor in any way affecting clear observation through the microscope.

Another object of the invention resides in the provision of a microscope, the head of which can be formed in any desired shape so as to conform with the recess or cavity into which the head is inserted when in use, thereby permitting close inspection of the membrane and tissue upon the interior of the cavity.

A still further object is to provide a microscope of the above mentioned character that can be sterilized by any of the quick cold sterilization methods now in use for handling medical and surgical instruments.

It is a further object of the invention to provide an illuminated microscope that can be manufactured at a very low cost and due to its simplicity can be readily and easily assembled and disassembled.

Other objects and advantages of the invention will become apparent from the accompanying drawing and specification.

In the drawing, wherein like reference characters designate corresponding parts throughout the several views:

Figure 1 is a perspective view showing the illuminated microscope being used as an otoscope.

Figure 2 is a side elevation of the microscope detached from the light casing and handle.

Figure 3 is a rear end view of the head portion of the microscope.

Figure 4 is a front end elevation of the head.

Figure 5 is an elevational view with parts in section of a modification wherein a telescope unit is associated with the head of the microscope.

Figure 6 is a view of a further modification showing the device used in viewing a moving picture film strip.

Figure 7 is a detail of a further modification of the head portion, wherein the lens is disposed at an angle to the horizontal longitudinal axis.

Figure 8 shows an elevational view of a still further modification of the head, wherein the same is cylindrical in shape.

Figure 9 is a rear end elevation of another modification of microscope.

Figure 10 is a detail view showing one type of socket for connecting the shank of the microscope to a light source.

Figure 11 is a fragmentary perspective view of a tongue depressor embodying the principles of the present invention, and Figure 12 is a transverse section taken approximately on the line 12—12 of Figure 11.

Referring first to the construction illustrated in Figures 1 to 4 inclusive, it will be observed that the microscope denoted generally by the numeral 1 includes a head 2 that tapers gradually toward its outer forward end. An extension 3 is formed at the upper portion of the rear end of the tapering head 1 and this extension is provided with a convex lens portion 4. A stem 5 projects rearwardly and downwardly from the lower portion of the head 2 and the lower end of the stem is threaded as at 6, for a purpose hereinafter to be more fully described. The upper portion of the stem is also of tapering formation, as is more clearly illustrated in Figures 3 and 4, and the portion of the stem that connects the tapered upper portion to the circular lower end portion is curved as at 7. The lower portion of the stem may be circular, square, elliptical or polygonal in cross-section.

The unit shown in Figure 2 is preferably formed as an integral piece from a transparent solid plastic, either thermo-setting or thermo-plastic, having great optical clarity, and wherein light will be transmitted therethrough by the phenomenon of internal reflection.

The microscope may be molded, die-shaped or otherwise formed to the desired configuration. Also, if desired, instead of making the head and stem in one piece, they may be separately formed or united in any suitable manner.

A tubular casing 8 adapted to house an incandescent filament bulb of the standard nature is provided at its open upper end with an internally threaded socket to detachably receive the lower threaded end 6 of the stem 5 to support the microscope in the manner shown in Figure 1. Current is supplied to the lamp within the casing 8 by means of the conductor 9, the latter being adapted for connection with any suitable source of current supply (not shown).

When using the device as an otoscope, the tapered head of the microscope is inserted in the ear and the observer, holding the casing 8, and with the current to the lamp turned on, the rays of light from the bulb will pass upwardly through the stem and through the body or head 2 and will be focused on the membrane and tissue at the inner end of the interior of the aural cavity, it being understood that the light rays will only be emitted through the outer end of the head of the microscope and not through the sides of the head. The observer by looking through the lens 4 will have a clear view of the region of the cavity under exploration.

It is to be understood that the shape of the head of the microscope may vary depending upon the configuration of the cavity into which it is to be placed, and by constructing a head in the manner shown, it may be placed against the object or area to be viewed without any danger of injury thereto.

In Figure 5, there is shown a modification of the invention, wherein a telescope is associated with the microscope for obtaining greater magnification. To this end, the extension 10 having the lens 11 is threaded at 12 to receive the forward threaded end portion of the tube 13, which carries the lens 14 in its rear end. In this form, the lower end of the shank 15 is not threaded and the same is fitted in the upper end of a socket 16, the latter receiving and housing the lamp unit 17. This instrument when assembled as shown, may be used in the same manner as the device shown in Figure 1.

In Figure 7, the head 18 has the lens 19 formed on its rear end disposed at an angle to the horizontal longitudinal axis as indicated by the lines 20 and 21 respectively, and these lines 20 and 21 intersect as at 22 which is the focal point. The stem which extends from the rear end of the head is shown at 23.

With reference now to Figure 8, it will be observed that the head 24 is cylindrical in shape, the lens being shown at 25 and the stem at 26. A microscope of this character may be used as a reading glass or when cavities requiring the using of cylindrical-shaped heads are to be examined.

Figure 9 shows a still further modification, wherein the stem 27 is formed with diverging arm portions 28 and 29 merging into the rear end of the head 30, on opposite sides of the lens 31. This will cause the rays of light that pass upwardly through the stem 27 to diverge when they reach the lower ends of the arms 28 and 29 and the divergent rays pass through the respective arms and longitudinally through the head 30, from whence they are emitted at its outer or forward end. This produces a larger or greater distribution of light rays emitted through the microscope.

In Figure 6, I have shown a still further modification of the microscope, that is adapted to be used in viewing a strip of moving picture film. In this particular modification, the head 32 is formed with a lens 33 at its forward end and the light source conducting stem 34 extends from the smaller rear end of the head or body 32. A slot 35 is provided in the head 32 through which the film strip shown in dotted lines extends.

A still further modification is shown in Figures 11 and 12 of the drawing. Here, the principle of my invention is embodied in a tongue depressor, comprising an elongated flat body 36 tapering in thickness gradually toward its outer forward end 39, with the sides converging toward the rear end and merging in the downwardly curved stem 37. The bottom face of the body 36 is formed with longitudinal and transverse grooves forming a serrated or roughened surface 38. This tongue depressor, when having its stem coupled up with a lamp housing, will receive the light rays passing through the stem and head and due to the phenomenon of internal reflection, all of the light rays will be confined in the head and will be emitted therefrom only through its outer forward end. The serrated bottom face of the body or head will aid in dispersing the light rays emitted.

It will thus be seen from the foregoing description that I have provided a microscope that will at all times be positive and efficient in carrying out the purposes for which it has been designed and due to its simplicity, the parts can be readily and easily assembled or disassembled.

It is to be understood that the lenses are to be an integral part of the head of the microscope and are to conform to prescription either for magnification, microscopic, telescopic or binocular use.

It is to be further understood that various changes in the size, shape and arrangements of parts may be resorted to without departing from the spirit of the invention and the scope of the appended claims.

Having thus described the invention, what I claim is:

1. In an illuminating viewing unit, an integrally formed optical magnifying element having an axis in whose direction it is particularly adapted to transmit light and having light-transmitting terminal faces transverse of said axis, and a relatively narrow light conducting conduit element formed on a first terminal face of said optical magnifying element eccentrically with reference to the axis of said optical magnifying element, the second terminal face of said magnifying element having a lens surface formed thereon and constituting a light exit face of said viewing unit, whereby an observer looking through the part of said first face not occupied by said conduit element can look through said magnifying element and can see through said second face the object illuminated.

2. In an illuminating viewing unit, an integrally formed optical magnifying element having an axis in whose direction it is particularly adapted to transmit light and having light-transmitting terminal faces transverse of said axis, and a relatively narrow light conducting conduit element formed on a first terminal face of said optical magnifying element at a point thereof near its peripheral surface which extends substantially parallel to the axis thereof, the second terminal face of said magnifying element having a lens surface formed thereon and constituting a light exit face of said viewing unit, whereby an observer looking through the part of said first face not occupied by said conduit element can look through said magnifying element and can see through said second face the object illuminated.

3. In an illuminating viewing unit, a substantially cylindrical integrally formed optical magnifying element, and a relatively narrow light conducting conduit element formed on a first base face of said cylindrical element eccentrically with reference to the axis thereof, the base faces of said cylindrical element being light-transmitting, the second base face of said magnifying element having a lens surface formed thereon constituting a light exit face of said viewing unit, whereby an observer looking through the part of said first base face not occupied by said conduit element can look through said magnifying element and can see through the second base face the object illuminated.

4. In an illuminating viewing unit, a substantially cylindrical integrally formed optical magnifying element, and a relatively narrow light conducting conduit element formed on a first base face of said cylindrical element eccentrically with reference to the axis thereof, said magnifying element having convex lens faces formed respectively on the base faces thereof, whereby an observer looking through the lens face on said first base face can look through said magnifying element and can see through the lens face on said second base face the object illuminated.

5. In an illuminating viewing unit, an integrally formed optical magnifying element having an axis in whose direction it is particularly adapted to transmit light and having light-transmitting terminal faces transverse of said axis, and a relatively narrow light conducting conduit element formed integrally with said magnifying element and projecting from a point on a first terminal face of said magnifying element near its peripheral surface which extends substantially parallel to the axis thereof, the second terminal face of said magnifying element having a lens surface formed thereon constituting a light exit face of said viewing unit, whereby an observer looking through the part of said first face not occupied by said conduit element can look through said magnifying element and can see through said second face the object illuminated.

6. In an illuminating viewing unit, an integrally formed optical magnifying element having an axis in whose direction it is particularly adapted to transmit light and having light-transmitting terminal faces transverse of said axis, and a relatively narrow light conducting conduit element formed on a first terminal face of said magnifying element at a point thereof near its peripheral surface which extends substantially parallel to the axis thereof, the second terminal face of said magnifying element having a lens surface formed thereon constituting a light exit face of said viewing unit, and terminal means provided on the end of said conduit element for applying a light source thereto, whereby an observer looking through the part of said first face not occupied by said conduit element can look through said magnifying element and can see through said second face the object illuminated.

7. In an illuminating viewing unit, a substantially cylindrical integrally formed optical magnifying element, a relatively narrow light conducting conduit element formed on a first base face of said cylindrical element adjacent the circumference thereof, the portion of said first base face not occupied by said conduit element being provided with a projecting cylindrical shoulder portion which terminates in a convex free face, the second base face of said magnifying element having a lens surface formed thereon constituting a light exit face of said viewing unit, whereby an observer looking through said convex face of said shoulder portion can look through said magnifying element and can see through said lens surface on said second base face the object illuminated 8. In an illuminating viewing unit, an integrally formed optical magnifying element having an axis in whose direction it is particularly adapted to transmit light and being long relative to its diameter and having light-transmitting terminal faces transverse of said axis, and a relatively long light conducting conduit element relatively narrow with respect to the diameter of said lens element formed on a first terminal face of said magnifying element eccentrically with reference to the axis of said magnifying element, the second terminal face of said magnifying element having a lens surface formed thereon and constituting a light exit face of said viewing unit, and a second face thereof constituting a light exit face of said viewing unit, said elements being formed of a transparent thermally moldable plastic material whereby an observer looking through the part of said first face not occupied by said conduit element can look through said magnifying element and can see through said second face the object illuminated.

9. In an illuminating viewing unit, a substantially cylindrical integrally formed optical magnifying element, and a relatively narrow light conducting conduit element formed on a first base face of said cylindrical element eccentrically with reference to the axis thereof, the second base face of said magnifying element having a lens surface formed thereon constituting a light exit face of said viewing unit, said elements being formed of a transparent thermally moldable plastic material, whereby an observer looking through the part of said first base face not occupied by said conduit element can look through said magnifying element and can see through the second base face the object illuminated.

10. In an illuminating viewing unit, an integrally formed optical magnifying element having an axis in whose direction it is particularly adapted to transmit light and having light-transmitting terminal faces transverse of said axis, and a relatively narrow light conducting conduit element formed integrally with said magnifying element and projecting from a point on a first terminal face of said magnifying element near its peripheral surface which extends substantially parallel to the axis thereof, the second terminal face of said magnifying element having a lens surface formed thereon constituting a light exit face of said viewing unit, said elements being formed of a transparent thermally moldable plastic material, whereby an observer looking through the part of said first face not occupied by said conduit element can look through said magnifying element and can see through said second face the object illuminated.

11. In an illuminating viewing unit, an integrally formed optical magnifying element having an axis in whose direction it is particularly adapted to transmit light and having light-transmitting terminal faces transverse of said axis, and a relatively narrow light conducting conduit element formed on a first terminal face of said magnifying element at a point thereof near its peripheral surface which extends substantially parallel to the axis thereof, said conduit element being of such size and so mounted on said magnifying element that a substantially unobstructed view through said magnifying element is obtained from the end carrying said conduit element, the second terminal face of said magnifying element having a lens surface formed thereon constituting a light exit face of said viewing unit and an observer can see through the lens surface on said second face the object illuminated.

12. In an illuminating viewing unit, a substantially frusto-conical integrally formed optical magnifying element, and a relatively narrow light conducting conduit element formed on the larger base face of said frusto-conical element eccentrically with reference to the axis thereof, the smaller base face of said element having a lens surface formed thereon constituting a light exit face of said viewing unit, whereby an observer looking through the part of the larger base face not occupied by said conduit element can look through said magnifying element and can see through the lens surface on said smaller base face the object illuminated.

13. In an illuminating viewing unit, a substantially cylindrical integrally formed optical magnifying element, and a pair of relatively narrow light conducting conduit elements formed on a first base face of said cylindrical element adjacent the circumference thereof and substantially diametrically opposed to each other, the portion of said first base face of said magnifying element not occupied by said conduit elements being provided with an integrally formed circular lens surface, the second base face of said element having a lens surface formed thereon constituting the light exit face of said viewing unit, whereby an observer looking through the lens surface on said first base face can look through said magnifying element and can see through the lens surface on said second base face the object illuminated.

14. In an illuminating viewing unit, an integrally formed optical magnifying element having axial symmetry and being long relative to its diameter and having light-transmitting terminal faces transverse of its axis, and a relatively long light conducting conduit element relatively narrow with respect to the diameter of said magnifying element formed on a first terminal face of said magnifying element eccentrically with reference to the axis of said magnifying element, the second terminal face of said magnifying element having a lens surface formed thereon and constituting a light exit face of said viewing unit, whereby an observer looking through the part of said first face not occupied by said conduit element can look through said magnifying element and can see through the lens surface on said second face the object illuminated.

15. In an illuminating viewing unit, an integrally formed optical magnifying element having axial symmetry and being long relative to its diameter and having light-transmitting terminal faces transverse of its axis, and a relatively long light conducting conduit element relatively narrow with respect to the diameter of said magnifying element formed on a first terminal face of said magnifying element eccentrically with reference to the axis of said magnifying element, the second terminal face of said magnifying element having a lens surface formed thereon and constituting a light exit face of said viewing unit, the portion of said first terminal face not occupied by said conduit element being provided with a projecting cylindrical shoulder portion which terminates in a convex free face, whereby an observer looking through the convex face of said shoulder portion can look through said magnifying element and can see through the lens surface on said second face the object illuminated.

16. In an illuminating viewing unit, an integrally formed optical magnifying element having axial symmetry and being long relative to its diameter and having light-transmitting terminal faces transverse of its axis, and a relatively long light conducting conduit element relatively narrow with respect to the diameter of said magnifying element formed on a first terminal face of said magnifying element eccentrically with reference to the axis of said magnifying element, the second terminal face of said magnifying element having a lens surface formed thereon and constituting a light exit face of said viewing unit, the portion of said first terminal face not occupied by said conduit element being provided with a lens surface, whereby an observer looking through the lens surface on said first terminal face can look through said magnifying element and can see through the lens surface on said second face the object illuminated.

JACK JOROSLOW.